United States Patent
Hult et al.

(10) Patent No.: US 6,598,895 B1
(45) Date of Patent: Jul. 29, 2003

(54) ARRANGEMENT FOR A TRACTOR VEHICLE

(75) Inventors: Magnus Hult, Valla (SE); Johan Wallin, Katrineholm (SE)

(73) Assignee: Scania CV Aktiebolag (publ) (SE)

( * ) Notice: Subject to any disclaimer, the term of this patent is extended or adjusted under 35 U.S.C. 154(b) by 37 days.

(21) Appl. No.: 09/762,182

(22) PCT Filed: May 30, 2000

(86) PCT No.: PCT/SE00/01111

§ 371 (c)(1),
(2), (4) Date: Mar. 14, 2001

(87) PCT Pub. No.: WO00/74998

PCT Pub. Date: Dec. 14, 2000

(30) Foreign Application Priority Data

Jun. 2, 1999 (SE) .............................................. 9902063

(51) Int. Cl.⁷ ............................. B60D 1/24; B62D 53/06
(52) U.S. Cl. ........................................ 280/400; 280/432
(58) Field of Search ................................. 280/400, 432; 180/312, 291

(56) References Cited

U.S. PATENT DOCUMENTS 3,528,678 A   9/1970   Moulton
4,593,786 A * 6/1986   Tate ............................ 180/291

FOREIGN PATENT DOCUMENTS

| CH | 282241 | 7/1952 | |
|----|--------|--------|--|
| DE | 909891 | 4/1954 | .................. 663/37 |
| SE | 504435 | 2/1997 | ...................... 21/2 |

* cited by examiner

Primary Examiner—Lesley D. Morris
Assistant Examiner—Matthew Luby
(74) Attorney, Agent, or Firm—Ostrolenk, Faber, Gerb & Soffen, LLP

(57) ABSTRACT

A towing vehicle includes a body on two frame side members and a towing device supported on the members. The frame side members extend substantially parallel in the longitudinal direction of the vehicle and are in a plane parallel to the surface on which the vehicle travels. The towing device is mounted on a towing beam which extends between the two frame side members at the rear of the vehicle and the towing device is couplable to a towable vehicle. A support arrangement at the rear of the vehicle is connected to the two frame side members and incorporates at least one and preferably two beams which are connected respectively to one of the frame side members either directly or by a connecting element that extends laterally outwardly from the respective frame side member. The beams are connected to a support member that extends across the body. The beams extend at an angle of inclination relative to the plane. In addition, there may be upstanding non-inclined columns from the frame side members or the connecting elements thereof to a support member that extends laterally across the body.

19 Claims, 3 Drawing Sheets

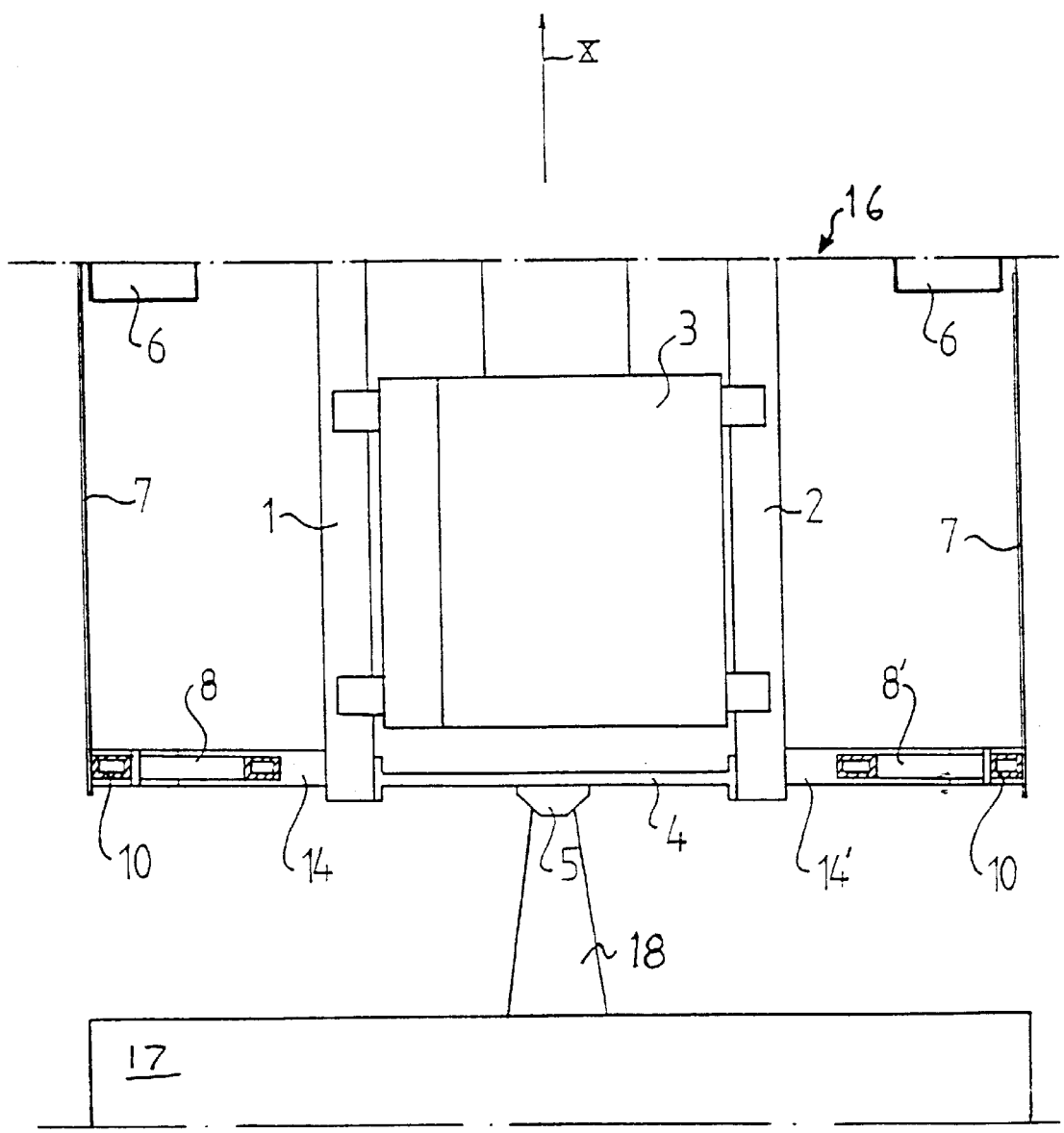

ARRANGEMENT FOR A TRACTOR VEHICLE

BACKGROUND TO THE INVENTION, AND STATE OF THE ART

The present invention relates to an arrangement for a towing vehicle in for a strengthened coupled connection with a towed vehicle and paticularly concerns a support contrivance or assembly connected to the frame side members of the vehicle and including a beam arragement.

Towing vehicles include in many cases a support contrivance arranged between two substantially parallel frame side-members to prevent sideways movement of the latter. When the towing vehicle is coupled to a trailer, laterally directed forces occur, for example, on bends, thereby causing a bending moment on the frame side-members. Such a support contrivance may take the form of a so-called crossstay, i.e. two members or rods which extend in a substantially horizontal plane diagonally between the frame sidemembers in such a way as to cross one another.

In some cases it may be difficult to fit such a support contrivance, e.g. where the towing vehicle has its drive engine in the rear end of the vehicle or has a cargo space at the rear end between the frame side-members. Modem buses often have the drive engine at the rear end for the sake of such advantages as more space in the forward parts of the bus to facilitate boarding. The drive engine thus hinders the fitting of a cross-stay or some similar support contrivance which extends between the frame side-members. The drive engine itself is usually mounted on the frame side-members but performs no supporting function, since it is mounted on resilient rubber cushions.

On certain markets it is also usual to use also towing vehicles such as buses, i.e. to have the towing vehicle carry passengers. Such towing vehicles do of necessity become relatively heavy, thereby further accentuating the problem indicated above. It would of course also be desirable to be able to use buses with the drive engine in the rear end as such towing vehicles.

SUMMARY OF THE INVENTION

The object of the present invention is to provide an arrangement for a towing vehicle whereby the problem mentioned above can be eliminated. What is more specifically aspired to is an arrangement which affords better support for the frame side-members when the towing of a trailer subjects the towing vehicle to large laterally directed forces, and which occupies little space once it is fitted.

This object is achieved by the arrangement indicated in the introduction which is characterised in that the beam element, as seen in said longitudinal direction, extends in a direction which is at a substantial angle of inclination relative to said plane. By means of such a beam element extending obliquely upwards with respect to the frame side-members it is possible to absorb laterally directed forces which act on the frame side-members. A support contrivance with at least one such beam element need not be of any substantial extent in the longitudinal direction of the towing vehicle and can therefore be fitted in towing vehicles with little vacant space. For example, the support contrivance may be fittable substantially vertically above the tow beam.

According to one embodiment of the invention, the support contrivance incorporates a support element which is arranged at a distance from the frame side-members and to which said beam element is connected. Such a support contrivance may with advantage incorporate at least one column member connected to a second of the frame sidemembers and to the support element. Lateral rigidity is further improved by such a column member. The towing vehicle may have a body mounted on the frame sidemembers, and the support element connected to the body. At the same time, the support element may be connected to one or more different body parts, e.g. the rear wall of the towing vehicle, a floorboard for an internal space of the towing vehicle, etc. The support element may with advantage incorporate a top member which extends substantially parallel with said plane.

According to another embodiment of the invention, the support contrivance incorporates at least one connecting element and said beam element is connected to the first frame side-member via said connecting element. In this case said connecting element may incorporate a transverse member which extends outwards from the first frame sidemember in a direction substantially parallel with said plane. Shifting the fastening of the beam element outwards makes it possible to achieve a favourable angle of inclination of the beam element. Said column member may also be connected to and extend from an outer end of the transverse member to the support element.

According to a further preferred embodiment of the invention the support contrivance incorporates two of said elongate beam elements each connected to its respective frame side-member. At the same time, the beam elements may with advantage extend symmetrically with respect to a central plane which is perpendicular to said plane. The beam elements may slope either inwards towards the central plane or outwards, and the two beam elements may with advantage be connected to the top member in a central region of the latter. The support contrivance may further incorporate two of said transverse members each extending outwards from its frame side-member, while each of the two elongate beam elements is connected to the outer end of its respective transverse member, and it may incorporate two of said column members each connected to the outer end of its respective transverse member and to a respective outer end of the top member.

According to a further preferred embodiment of the invention the towing vehicle is a bus and it has a drive motor for propelling it which is mounted at least partially between the frame side-members in the vicinity of the rear end of the towing vehicle ahead of the support contrivance and the tow beam as seen in the forward movement direction of the towing vehicle.

According to a further preferred embodiment of the invention the support contrivance and the tow beam are arranged removably on the towing vehicle in said rear end. The tow beam and the beam elements, column members and transverse members of the support contrivance are preferably detachably fastenable to the top member and the frame side-members respectively.

BRIEF DESCRIPTION OF THE DRAWINGS

The invention will now be explained in more detail on the basis of embodiments described by way of examples and with reference to the attached drawings, in which FIG. 3 shows a sectional view along the line III—III in FIG. 2.

DETAILED DESCRIPTION OF VARIOUS EMBODIMENTS OF THE INVENTION

Figure 1:
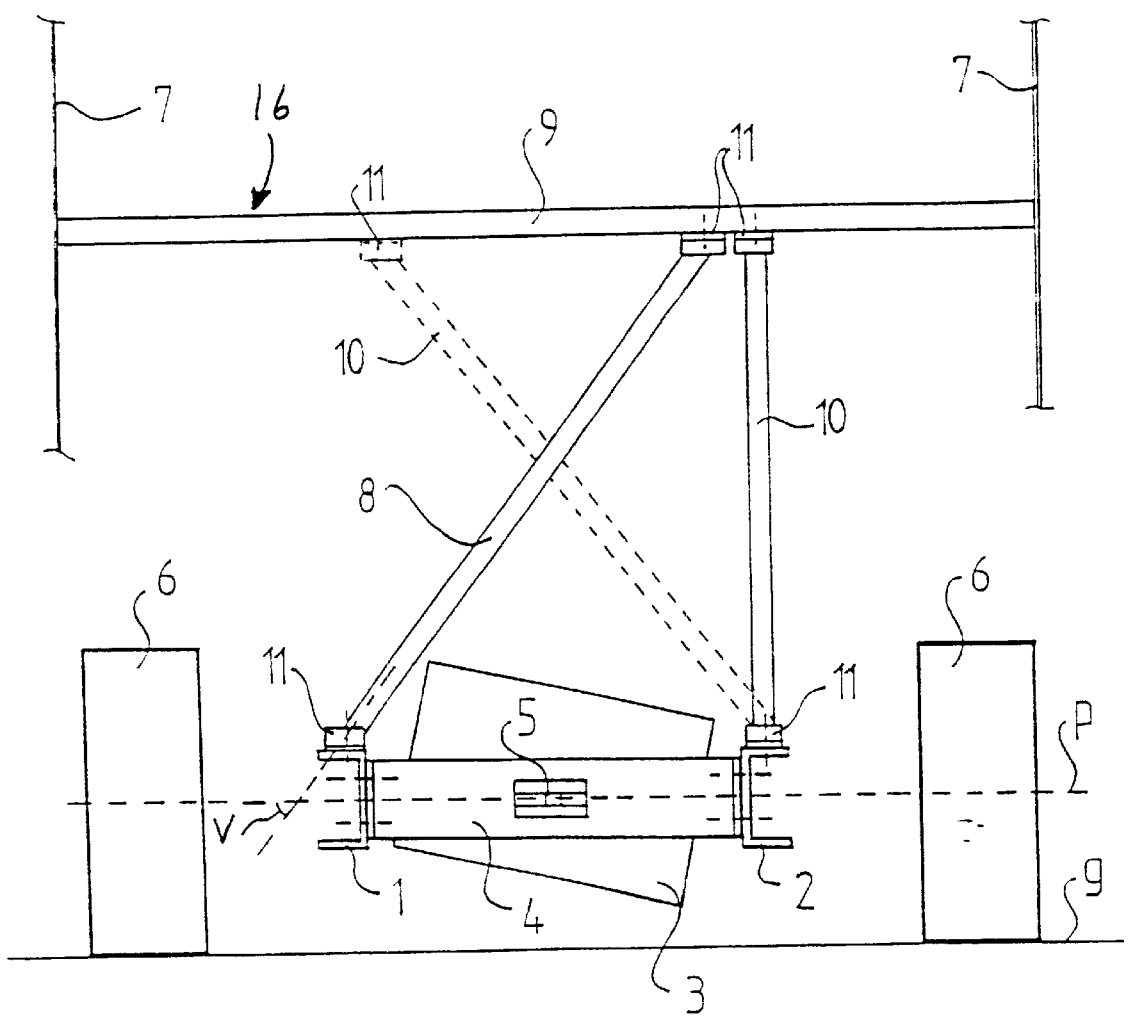
FIG. 1 shows a view from the rear of an arrangement according to a first embodiment of the invention fitted to a towing vehicle.

FIG. 1 depicts an arrangement according to a first embodiment of the invention. The arrangement is fitted to a towing vehicle 16 which is shown from the rear in FIG. 1 and which is only represented by two elongate frame side-members 1,2, a drive engine 3 fitted between the frame side-members 1,2, and a tow beam 4, with a towing device 5, fitted between the frame side-members 1,2. The towing vehicle 16 also incorporates at least four wheels, the two rearmost wheels 6 of which are depicted, and a partially implied body 7. The frame side-members 1,2 extend substantially parallel with one another in the vehicle's longitudinal direction x, see FIG. 3, and with a plane p which is essentially parallel with a substrate g on which the vehicle normally travels. As may be seen in FIG. 3, the drive engine 3 for propelling the vehicle is arranged in the rear end of the vehicle and may slope somewhat as seen in the direction x. The vehicle is intended to tow a trailer 17 and is couplable to the trailer 17 by means of a tow bar 18, the towing device 5 and the towing beam 4 which extends substantially perpendicular to the longitudinal direction x. Even if the vehicle described refers to a bus designed to tow a relatively large trailer, it should be noted that the invention is not limited to such vehicles but is applicable to all types of towing vehicles with longitudinal parallel frame members.

The invention incorporates a support contrivance which is arranged in the rear end of the vehicle and connected to the two frame side-members 1,2 with the object of supporting the frame side-members 1,2 in the lateral direction and hence preventing the frame side-members 1,2 from moving sideways as a result of the laterally directed forces caused by the trailer. In a first embodiment the support contrivance incorporates an elongate beam element 8, a support element in the form of a top member 9, and a column member 10. The top member 9 extends transverse to the vehicle's longitudinal direction x and substantially parallel with the plane p. The beam element 8 is connected to the first frame side-member 1 and the top member 9. The beam element 8 extends obliquely upwards from the frame side-member 1 to the top member 9 and slopes relative to the plane p at an angle of inclination v. This substantial angle of inclination v may be between 10 and 80°, preferably between 30 and 60°. According to an advantageous embodiment the angle v is about 45°. The column member 10 is connected to the second frame side-member 2 and the top member 9 and extends substantially parallel, i.e. substantially perpendicular relative to the plane p, from the second frame side-member 2. Looked at from above, the beam element 8 and the column member 10 thus extend in a substantially vertical plane.

It should be noted, however, that it is possible to have the column member 10 and the beam element 8 slope somewhat forwards in the longitudinal direction x, i.e. the top member 9 may be situated somewhat forward of the fastenings in the respective frame side-members 1,2 of the beam element 8 and the column member 10. In the embodiment depicted the beam element 8 and the column member 10 each incorporate fastening devices 11 at both of their ends. These fastening devices 11 may take many different forms, such for example as plates which are firmly welded to the end surfaces of the beam element 8 and the column member 10 respectively and which exhibit holes for accommodating threaded connections for fastening in the top member 9, the frame side-member 1 and the frame side-member 2 respectively.

According to an alternative version indicated by broken lines, the column member 10 in FIG. 1 may slope in a similar manner to the beam element 8, i.e. with the column member 10 and the beam element 8 extending to the top member 9 in such a way that they cross one another in a central region. It is also possible to have the sloping column member constitute a complement to the substantially vertical column member 10.

Figure 2:
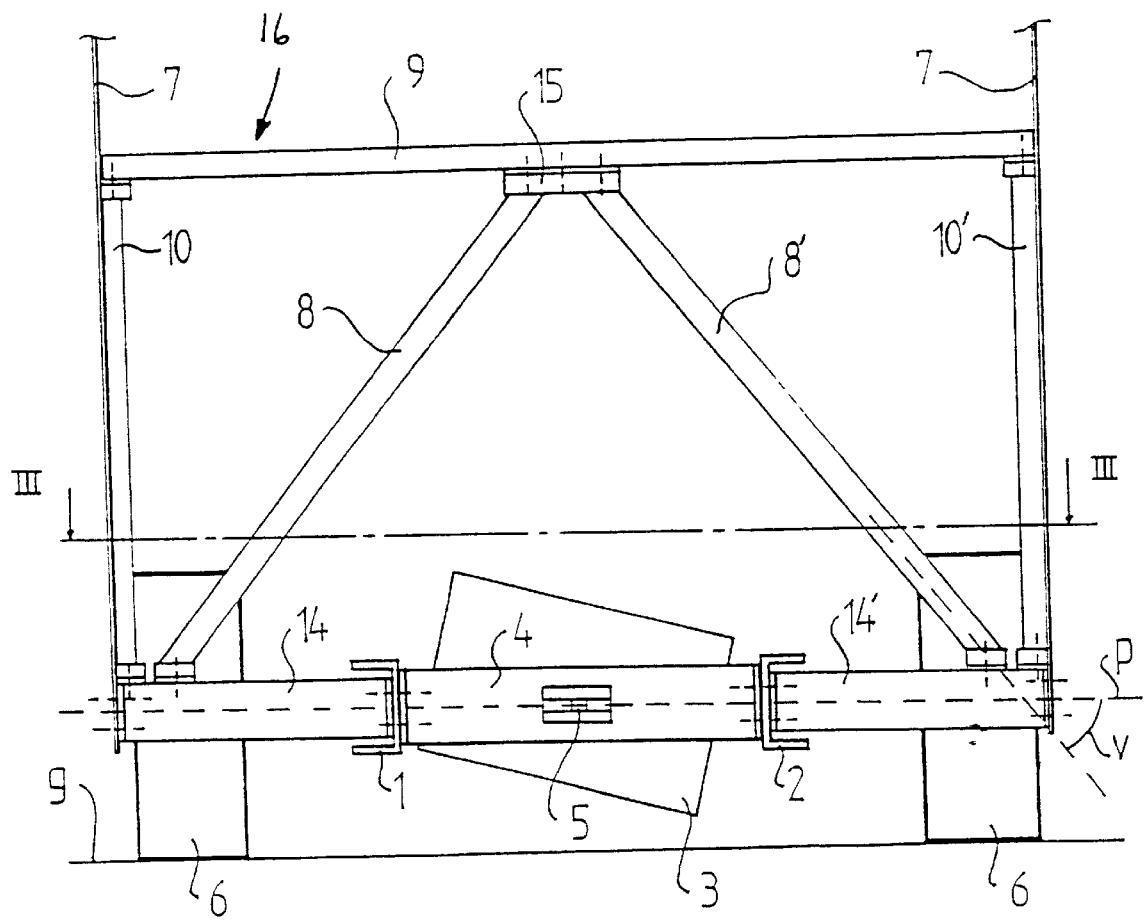
FIG. 2 shows a view from the rear of an arrangement according to a second embodiment of the invention fitted to a towing vehicle.

FIGS. 2 and 3 depict a support contrivance according to a second embodiment of the invention. It should be noted that items with corresponding functions and/or construction have been provided with the same reference notations in all the embodiments depicted. In this case the support contrivance incorporates two transverse members 14,14', each of which extends substantially perpendicular outwards from its respective frame side-member 1,2. Each transverse member 14,14' is fastened in the respective frame side-member 1,2 by means of implied threaded connections and in the body 7 by means of further threaded connections. Each of the transverse members 14,14' has extending from its outer end a respective column member 10,10' and a respective beam element 8,8'. The column members 10,10' extend substantially vertically upwards from the respective transverse members 14,14' and substantially parallel with the outer walls of the body 7. The beam elements 8,8' extend obliquely inwards to a central region of the top member 9 and are firmly connected to the top member 9 by means of a common fastening device 15. Also according to this embodiment the column members 10,10' and the beam elements 8,8' may slope somewhat forwards in the longitudinal direction x, i.e. the top member may be situated somewhat forward of the tow beam 4. As seen in the longitudinal direction x, the angle of inclination v of the beam elements 8,8' may in this embodiment likewise be between 10 and 80°, preferably between 30 and 60°, and in one preferred embodiment about 45°.

In the embodiments depicted the beam elements 8,8', the column members 10,10' and the top member 9 are depicted as square sections. It should be noted that members with many different cross-sectional shapes may be used for the various members of the support contrivance, e.g. U-beams, I-beams, T-beams, solid rods with polygonal or circular cross-section etc.

The top member 9 may be connected to the side-walls of the body 7, the rear wall of the body 7 or an internal floor of, for example, a bus in such a way that the internal floor rests on the upper side surface of the top member 9.

The invention is not limited to the embodiments depicted but may be varied and modified within the scope of the patent claims below. Many different directions of the beam elements are likely to be possible within the scope of the invention. For example, the beam elements 8,8' may, instead of forming an apex pointing upwards, be arranged in such a way as to point downwards. At the same time, the beam elements 8,8' may extend up to and be connected to the tow beam 5 or each be connected to its respective frame side-member 1,2.

What is claimed is:

1. A towing arrangement for a towing vehicle, comprising
   the vehicle having a body and first and second spaced apart frame side members, the side members extending substantially parallel to each other and in a longitudinal direction of the towing vehicle and being in a plane substantially parallel to a surface on which the vehicle travels;
   a tow beam extending between the frame side members;

a towing device mounted on the tow beam, the towing device may be coupled to another vehicle that is to be towed by the towing device;

the towing arrangement comprising a support assembly including a support element spaced away from and above the frame side members and parallel to the plane;

at least one elongate beam connected to the first frame side member, the at least one elongate beam extending in a direction that is at an angle of inclination relative to the plane of the frame side members and the at least one beam extending from the first frame side member to the support element over a distance; and at least one column connected to the second frame side member and to the support element, and the column is in a plane perpendicular to the plane of the frame side members.

2. The arrangement of claim 1, wherein the vehicle body is mounted on the frame side members, and the support element is connected to the vehicle body.

3. The arrangement of claim 2, further comprising a respective connecting element on at least the first side frame member and extending outwardly from the first frame side member, and the beam is connected to the first frame side member by being connected to the connecting element.

4. The arrangement of claim 3, wherein the connecting element extends outward laterally from the respective frame side member and in a direction substantially parallel to the plane.

5. The arrangement of claim 1, further comprising a respective first and second connecting element on each of the first and second frame side members, each of the first and second connecting elements extending laterally outwardly from the respective one of the first and second frame side members;

the beam is connected to the first frame side member by being connected to the connecting element; and the column is connected to the second frame side member by being connected to the second connecting element.

6. The arrangement of claim 2, wherein the support assembly includes two of the elongate beams and each of the beams is connected to a respective one of the first and second frame side members and also to the support element.

7. The arrangement of claim 6, wherein the support element extends laterally across the body of the vehicle, the support element has a central region laterally across the vehicle and the beams are connected to the support element in the central region thereof.

8. The arrangement of claim 7, further comprising a respective one of the first and second connecting elements on and extending laterally outward from each of the first and second frame side members; each of the beams being connected to a respective one of the frame side members by being connected to the respective connecting elements connected to the frame side member.

9. The arrangement of claim 8, wherein the support assembly includes two columns, each column being respectively connected to one of the first and second frame side members and both columns being connected to the support element, and each column is in a plane perpendicular to the plane of the frame side members;

each column being connected to the respective one of the first and second side frame members by being connected to the respective connecting element thereat.

10. The arrangement of claim 9, wherein each column is perpendicular to the plane of the frame side member.

11. The arrangement of claim 6, further comprising a respective one of the first and second connecting elements on and extending laterally outward from each of the first and second frame side members; each of the beams being connected to a respective one of the frame side members by being connected to the respective connecting elements connected to the frame side member.

12. The arrangement of claim 6, wherein the support assembly includes two of the columns, each column being connected to a respective one of the first and second frame side members and also to the support element, and the columns are each in a plane perpendicular to the plane of the frame side members.

13. The arrangement of claim 12, wherein each column is perpendicular to the plane of the frame side member.

14. The arrangement of claim 2, wherein the support assembly and the tow beam are removably arranged in the towing vehicle and at the rear of the towing vehicle with respect to the longitudinal direction of the towing vehicle.

15. The arrangement of claim 1, wherein the towing vehicle includes a vehicle body mounted on the frame side members, and the support element is connected to the vehicle body.

16. The arrangement of claim 15, further comprising a respective connecting element on at least the first side frame member and extending outwardly from the first frame side member, and the beam is connected to the first frame side member by being connected to the connecting element.

17. The arrangement of claim 1, wherein the towing vehicle includes a drive engine which is mounted at least partially between the frame side members, forward of the support assembly and forward of the tow beam in the longitudinal direction of the towing vehicle.

18. The arrangement of claim 17, wherein the beam and the column are both located toward the rear of the vehicle in the longitudinal direction of the vehicle.

19. The arrangement of claim 1, wherein the column is perpendicular to the plane of the frame side members.

* * * * *